United States Patent [19]
Stephenson

[11] Patent Number: 6,166,796
[45] Date of Patent: *Dec. 26, 2000

[54] FLAT PANEL DISPLAY HAVING INTERCONNECTED PATTERNABLE CONDUCTIVE TRACES HAVING PIERCING PINS PIERCING CONDUCTIVE TRACES AND A LIGHT MODULATING LAYER

[75] Inventor: Stanley W. Stephenson, Spencerport, N.Y.

[73] Assignee: Eastman Kodak Company, Rochester, N.Y.

[ * ] Notice: This patent is subject to a terminal disclaimer.

[21] Appl. No.: 09/010,357

[22] Filed: Jan. 21, 1998

[51] Int. Cl.⁷ .................................................... G02F 1/1345
[52] U.S. Cl. ............................................................. 349/149
[58] Field of Search ............................... 349/106, 2, 116, 349/42, 149

[56] References Cited

U.S. PATENT DOCUMENTS

| | | |
|---|---|---|
| 3,033,765 | 5/1962 | King et al. . |
| 3,464,822 | 9/1969 | Kingsley . |
| 4,435,047 | 3/1984 | Fergason . |
| 4,610,509 | 9/1986 | Sorimachi et al. ...................... 350/339 |
| 4,803,150 | 2/1989 | Dickerson et al. . |
| 5,462,822 | 10/1995 | Roosen et al. . |
| 5,471,330 | 11/1995 | Sarma ....................................... 359/59 |
| 5,858,581 | 1/1999 | Stephenson ................................ 430/7 |

FOREIGN PATENT DOCUMENTS 08271918  10/1996  Japan .

OTHER PUBLICATIONS

O'Mara, Liquid Crystal, Flat Panel Displays, Chapman & Hall, New York 1993.

*Primary Examiner*—Walter Malinowski
*Attorney, Agent, or Firm*—Raymond L. Owens

[57] ABSTRACT

A flat panel display including a light modulating layer having two surfaces and formed of pierceable material; first vertical and second horizontal conductive traces formed respectively on the surfaces of the light modulating layer; and conductive piercing pins connected to the first and second conductive traces.

3 Claims, 7 Drawing Sheets

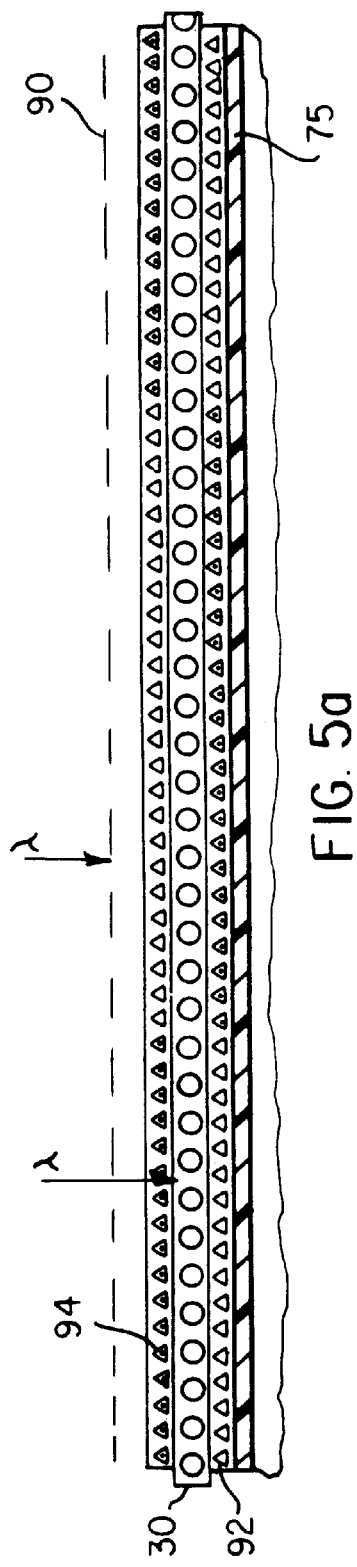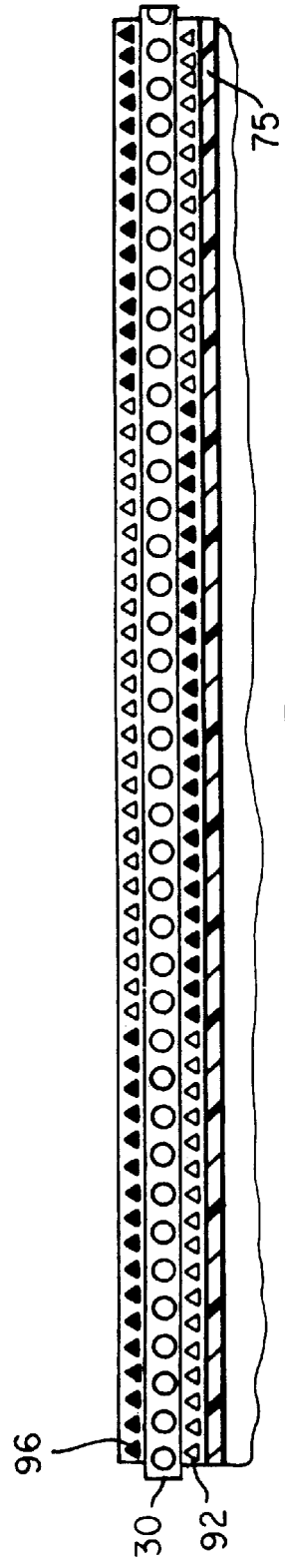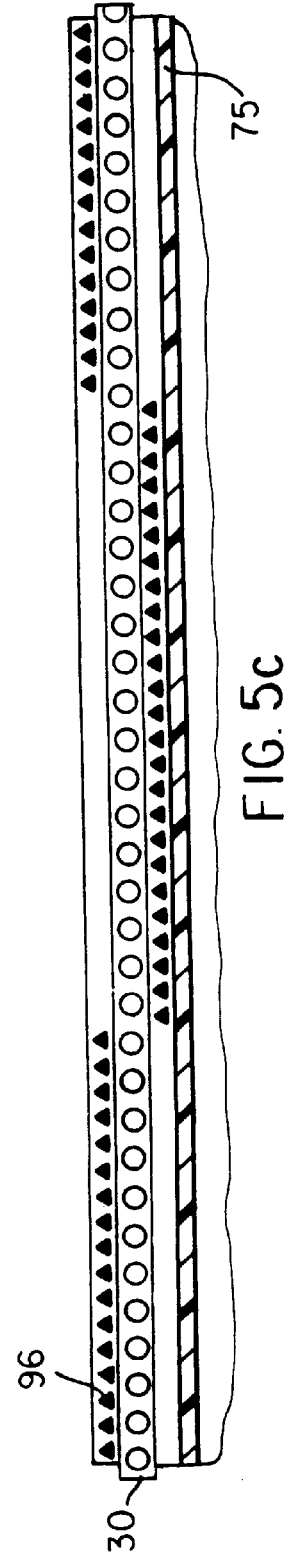

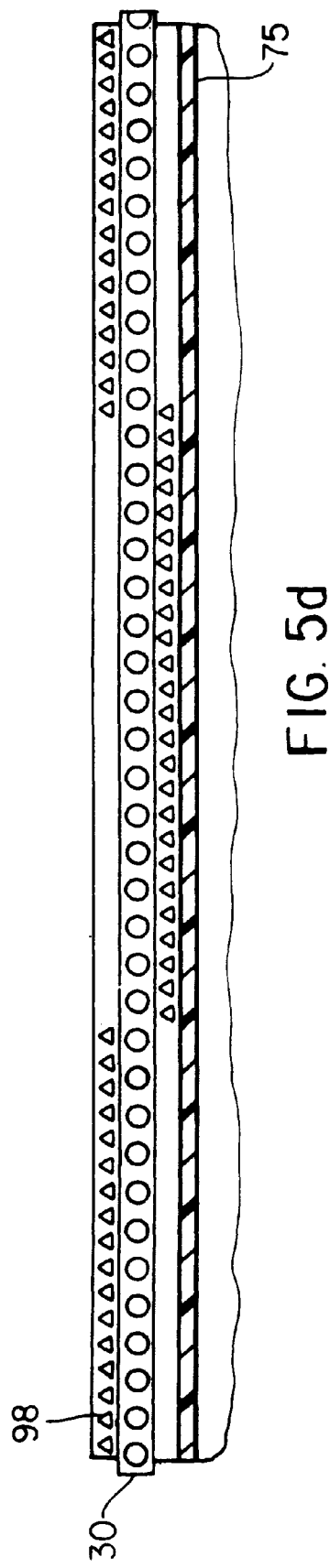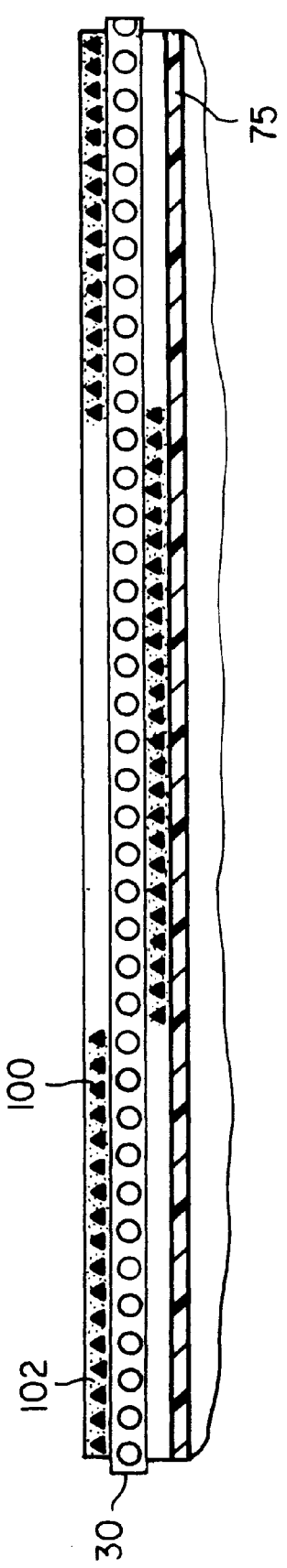

FLAT PANEL DISPLAY HAVING INTERCONNECTED PATTERNABLE CONDUCTIVE TRACES HAVING PIERCING PINS PIERCING CONDUCTIVE TRACES AND A LIGHT MODULATING LAYER

CROSS REFERENCE TO RELATED APPLICATIONS

Reference is made to commonly assigned U.S. patent application Ser. No. 08/961,059 filed Oct. 30, 1997 now U.S. Pat. No. 5,958,634, entitled "Display Apparatus Using Light Patternable Conductive Traces" by Stanley W. Stephenson; U.S. patent application Ser. No. 08/961,056 now U.S. Pat. No. 5,990,994, filed Oct. 30, 1997 entitled "Single Sheet Display Having Patternable Conductive Traces" by Stanley W. Stephenson; U.S. patent application Ser. No. 08/990,853, now U.S. Pat. No. 6,025,952, filed Dec. 15, 1997, entitled "Method of Producing a Display Having Patternable Conductive Traces" by Stanley W. Stephenson and U.S. patent application Ser. No. 08/990,891, now U.S. Pat. No. 5,858,581, filed Dec. 15, 1997, entitled "A Sheet Having Patternable Conductive Traces For Use in a Display" by Stanley W. Stephenson, the disclosures of which are incorporated herein by reference.

FIELD OF THE INVENTION

This invention relates to flat panel displays that use electrically modulated signals to control light passing through them.

BACKGROUND OF THE INVENTION

Flat panel displays are fabricated using many techniques. See, for example, Liquid Crystal Flat Panel Displays by William C. O'Mara (Chapman & Hall, New York 1993), and other similar publications. These displays use transparent glass plates as substrates, and electrical traces are sputtered in a pattern of parallel lines that form a first set of conductive traces. A transparent conductor such as Indium Tin Oxide (ITO) is sputtered over the traces to disperse an electrical charge across transparent areas not blocked by the traces. Alternatively, the traces can be formed entirely of ITO. A second substrate is similarly coated with a set of traces having a transparent conductive layer.

Layers are applied over the substrates and patterned to orient liquid crystals in twisted nematic (TN) or super-twisted-nematic (STN) configurations. The two substrates are spaced apart and the space between the two substrates is filled with a liquid crystal material. Solder interconnects or wire bonds are connect the traces to external an external drive. Pairs of conductors from either set are selected and energized to alter the optical transmission properties of the liquid crystal material.

In another embodiment, the traces do not define an orthogonal grid, but are organized to form alpha-numeric displays or graphic images. In a further embodiment, an active display on a transparent substrate is sputtered or printed and uses memory elements to continuously drive a each display element depending on information written to the memory element. In another embodiment, disclosed in SID DIGEST 90, article 12.6, the liquid crystal material can be polymerically dispersed to form a Liquid Crystal Polymer Matrix (LCPC). LCPCs are typically disposed in ultra-violet polymerized acrylic polymers. The liquid crystals are homogenized into the polymer, and the emulsion is coated onto a substrate. Ultra violet light is applied to the emulsion. The emulsion hardens, and bubbles of liquid crystal material are held in a rigid polymeric matrix.

Reflective liquid crystal polymer matrix displays are disclosed in U.S. Pat. No. 4,435,047. A first sheet has a transparent Indium-Tin-Oxide (ITO)conductive areas and a second sheet has electrically conductive inks formed into display areas. The sheets can be glass, but in practice have been formed of Mylar polyester. A dispersion of liquid crystal material in a binder is coated on the first sheet, and the second sheet is pressed onto the liquid crystal material. Electrical charges applied to opposing conductive areas operate on the liquid crystal material to expose display areas. Taliq Corporation of Sunnyvale, California currently produces products which form electrical interconnection by offsetting the two sheets and contacting trace conductors from each of the two sheets.

Image displays can provide color images if a color filter array is formed over the pixels of the display. In U.S. Pat. No. 5,462,833, three color layers are formed on a transparent substrate. In this patent, a transparent electrode layer is formed over the color filter. The filter plate is aligned onto a liquid crystal layer. The plate is glass and has silver halide, color-forming layers. A transparent electrode material is sputtered at high temperature over the CFA. In practice, the presence of the transparent electrode material causes ionic migration of the dyes in the dye layers.

Multiple, separate layers on multiple plates are presently used to build up the display. The electrical traces and transparent conductive layers are typically formed through repeated vacuum deposition of materials on the substrate. These processes are expensive and require long processing times on capital intensive equipment. Because most display structures are formed of glass, two sheets are used and are offset to permit connection to two separate and exposed sets of traces that are disposed on separate sheets.

SUMMARY OF THE INVENTION

An object of the present invention is to provide a simple and effective electrical connections in a flat panel display using light modulating materials.

Another object of this invention is to form electrical interconnection with the conductive traces formed on surfaces of layers of electrically modulated materials.

Another object of the present invention is to provide a way to efficiently interconnect the conductive traces in a flat panel display.

These objects are achieved in a flat panel display comprising:

(a) a light modulating layer having two surfaces and formed of pierceable material;

(b) first vertical and second horizontal conductive traces formed respectively on the surfaces of the light modulating layer; and (c) conductive piercing means having piercing pins connected to the first and second conductive traces.

The invention uses two separated sets of traces to provide electrical potential across light modulating material. Connection is made to the two sets of traces using piercing pins. Traces are formed so that pins interconnect to either a first or second layer.

The disclosed structure has the advantage of providing interconnection to traces on multiple layers of an image forming display having multiple layers of light sensitive, conductor forming material. The interconnection permits the production of a display using low-cost, low-temperature layers and processes. The display can utilizes low-cost photographic layer technology. It employs a light modulating layer and patterned transparent conductive traces. Large volumes of sheet material can be coated and formed into different types of displays by exposing the light sensitive material to different patterns.

The present invention lowers the cost of flat panel displays and is amenable to the creation of low-cost large flat panel displays.

BRIEF DESCRIPTION OF THE DRAWINGS

FIG. 4b is a broken sectional view of FIG. 4a;

FIGS. 5a–5e show various steps in the formation of the conductive traces in accordance with the present invention;

FIG. 6b is a sectional view taken along the lines B—B of FIG. 6a.

DETAILED DESCRIPTION OF THE INVENTION

The present invention makes use of two coatings of light-patternable, conductor forming layers which are patterned to form conductive traces on either side of electrically modulated, material.

Figure 1:
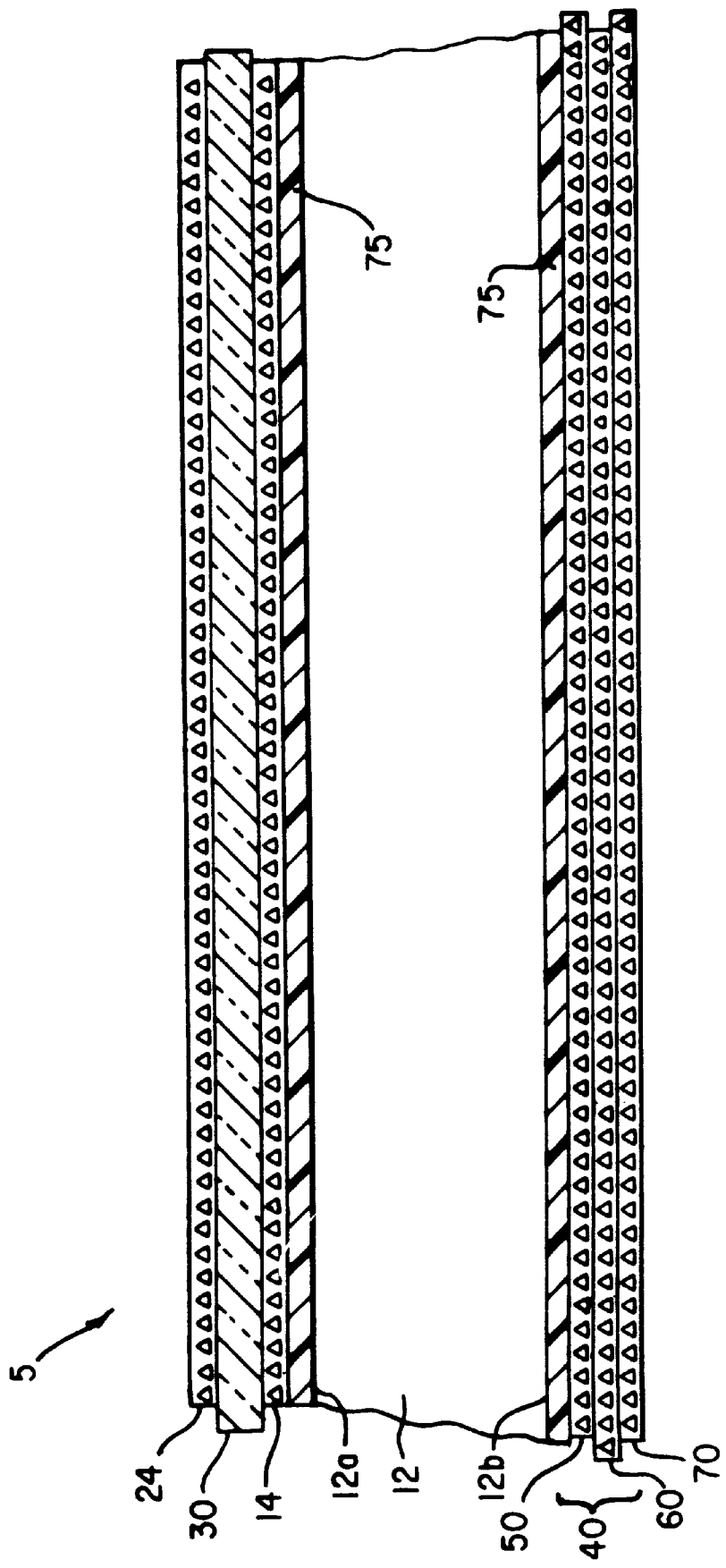
FIG. 1 is a sectional view of an unprocessed flat panel display in accordance with the present invention.

A sectional view of a display 5 in accordance with the invention is shown in FIG. 1. The display 5 has a substrate 12 is used which can be a clear transparent material such as Kodak Estar film base formed of polyester plastic and has a thickness of between 20 and 200 microns. In the exemplary embodiment, substrate 12 is a 80 micron thick sheet of polyester film base. Other clear polymers, such as Mylar polyester can also be used. Substrate 12 must be formed of a substance that permits penetration of an electrical conductor. Substrate 12 has a first surface 12a that supports a light sensitive, metal forming layer 14.

In the preferred embodiment, the light sensitive, metal forming layer 14 is an emulsion of silver halide grains. Alternatively, other light sensitive, metal forming materials can be used such as gold or copper salts. In the case of silver halide emulsions, high concentrations of silver halide salts in a binder such as gelatin or polyvinyl alcohol (PVA) are used to improve conductivity over conventional imaging emulsions. Conductive additives such as fine Indium-Tin-Oxide or fine silver with particle sizes between 0.5 and 2 microns are added to emulsion to improve conductivity of photographically produced metallic silver.

Over the first light sensitive, metal forming layer 14 is provided a coatable light modulating layer 30. Light modulating layer 30 can be a liquid crystal of conventional design. Such material should exhibit high optical and electrical anisotropy and match the index of refraction of the carrier polymer when the material is electrically oriented. Examples of such liquid crystal materials are Merck MLC-6406, MLC-6422, MLC 6436-000, 6436-100, 9300-100. In one embodiment, a liquid crystal material is homogenized in a polymeric binder such as gelatin or polyvinyl alcohol (PVA).

It is important that the binder have a low ionic content. The presence of ions in such a binder hinders the development of and electrical field across the dispersed liquid crystal material. Additionally, ions in the binder can migrate in the presence of an electrical field, chemically damaging the light modulating layer 30. Light modulating layer 30 must be formed of materials that permit penetration by an electrical conductor. The liquid crystal and gelatin emulsion is coated to a thickness of between 1 and 30 microns to optimize light modulating of light modulating layer 30. Other light-modulating, electrically operated materials can also be coated such as a micro-encapsulated ferroelectric (FLC) material.

Figure 2:
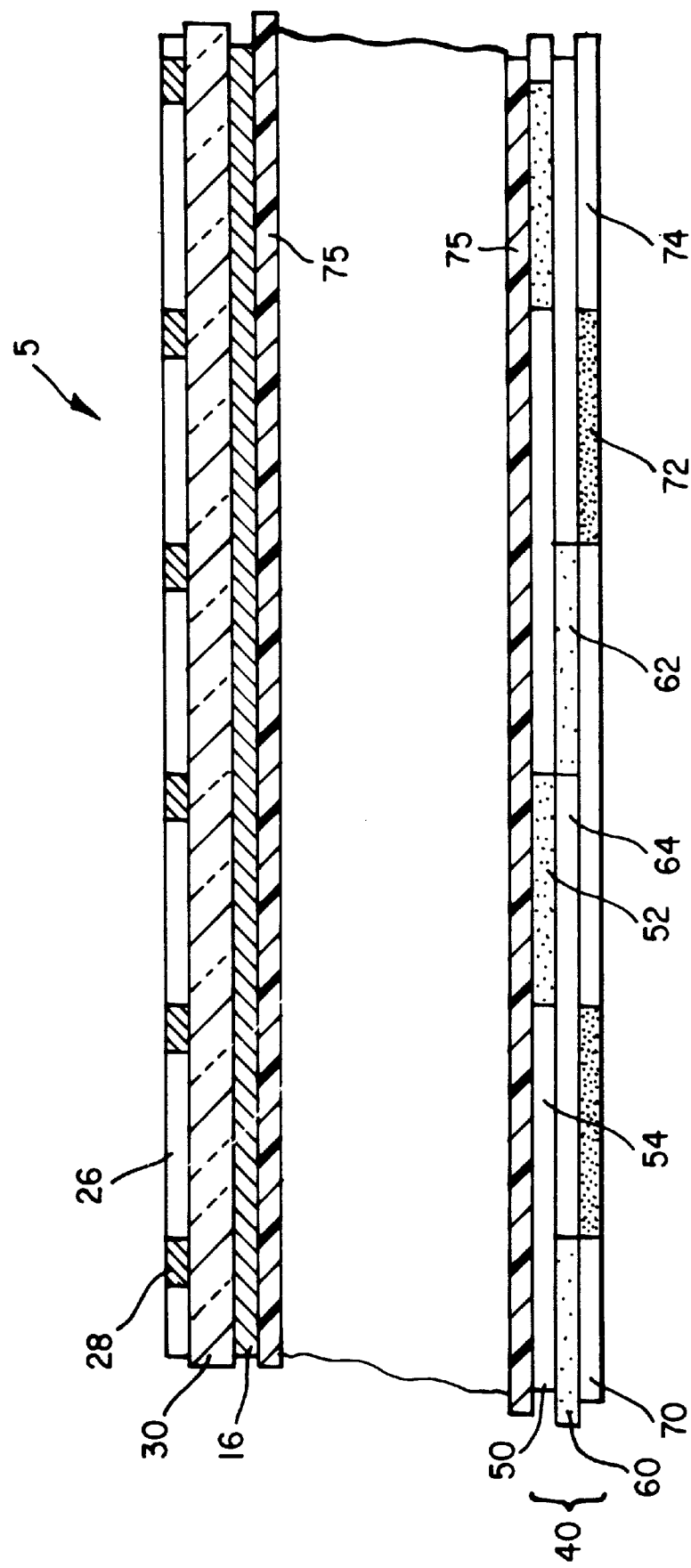
FIG. 2 is a sectional view showing the color filter array of the display of FIG. 1 after having been processed.

A second light sensitive metal forming layer 24 is applied over the light modulating layer 30. Second light sensitive metal forming layer 24 is similar in nature to first light sensitive metal forming layer 14 but is sensitized to a different wavelength of light. In the case of silver halide emulsions, conventional light sensitizers are used. In one embodiment, first light sensitive metal forming layer 14 is silver halide emulsion sensitized to green light. Second light sensitive metal forming layer 24 is a silver halide emulsion sensitized to red or infra-red radiation. In FIG. 2, each of the light sensitive metal forming layer 14 and light sensitive metal forming layer 24 has been exposed to their respective sensitized color of light through one or more masks and developed to form non-conducting areas 26 and conductive traces 28. The horizontal traces 16 and the vertical traces 28 are aligned for interconnection as will be described later. A layer containing silver halide in gelatin has the property that electrical conductors can penetrate into and through such layers.

The second surface 12b of substrate 12 supports a color filter array 40. Color filter array 40 can be a single layer printed on first substrate 12 before first light sensitive metal forming layer 14 is applied to substrate 12. Alternatively, color filter array 40 can be three layers of silver halide color dye forming chemistry, each layer forming a separate color of color filter array 40. An example of such a multi-layer array can be found in U.S. Pat. No. 5,462,822. In the '822 patent a conductive layer is sputtered under high temperature over the color filter array. In this invention, the conductive layer is metallic traces disposed on the first surface 12a substrate 12.

It is a feature of this invention that color filter array 40 be disposed on the second surface 12b of the sheet in the case of silver halide color dye forming emulsions. Metal development processes that are used to create electrically conducting traces 16 and 28 require retention of the metallic silver. In the case of color dye forming silver halide emulsions, the opaque metallic silver must be removed to permit transmission of light through the formed dyes. Disposing the color forming silver halide emulsions on one side and the metal forming silver halide emulsion on the other side of substrate 12 permits separate chemical processing of the layers. In the case of having color filter array 40 formed on the second side 12b of substrate 12, the size of the formed pixels must be significantly greater than the thickness of the sheet to prevent light from one modulated pixel from illuminating a different color filter area. In the case of an 80 micron thick substrate 12, the dimensions of the pixels should be greater than 5 times the thickness of the sheet, or greater than 400 microns.

FIG. 2 shows the exposed and developed color filter array 40. A red filter layer 50 is a silver halide emulsion layer that has been exposed and developed to create red filter dyed areas 52 and red filter undyed areas 54. A second green filter layer 60 is a silver halide emulsion layer that has been exposed and developed to form green filter dye areas 62 and green filter undyed areas 64. A blue filter layer 70 is a silver halide emulsion that has been exposed and developed to from blue filter dyed areas 72 and blue filter undyed areas 74. The exposure and development of a multi-layer color filter array can be done before application of layers on the opposite side of the sheet. Alternatively, color filter array 40 can be printed as a single layer on first surface 12a or second surface 12b using non-light sensitized printing processes such as screen printing. In the case of a pre-printed color mask, exposure mask 90 (in FIG. 5a) that forms traces in the light sensitive metal forming layers 14 and 24 is aligned to color filter array 40 so that traces 16 and 28 align to color filter array 40.

In a preferred embodiment all layers on both sides are exposed simultaneously. Layers of light absorbing material 75 are coated on one or both surfaces 12a and 12b of substrate 12. Such light absorbing materials 75 are disclosed in U.S. Pat. No. 4,803,150. U.S. Pat. No. 4,803,150 is an x-ray film having light sensitive emulsions on both sides. A dye is present between the silver-halide layers and the substrate in the form of microcrystalline particles which discolor in less than 90 seconds during processing. Light absorbing material 75 permits independent exposure of the layers on the two surfaces of substrate 12. Light absorbing material 75 is soluble in the solutions used to develop the light sensitive layers so that the substrate is optically transmitting after the sheet has been processed.

Figure 3:
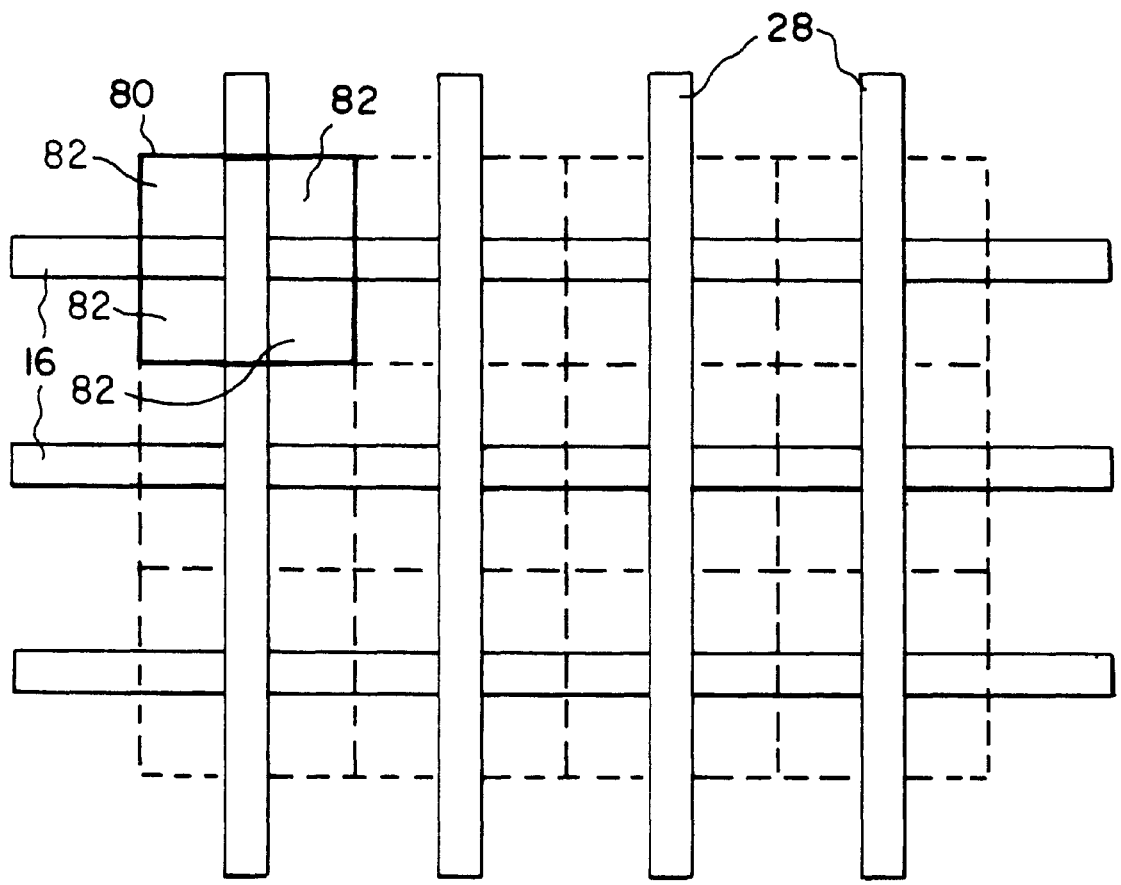
FIG. 3 is a top view of the processed display of FIG. 1.

Views of a completed sheet are shown in FIG. 3. For sake of clarity, it is assumed that the light modulating material has been driven to a transparent state and no color filter array has been applied to the second surface 12b of substrate 12. Vertical traces 28 are in second light sensitive, metal forming layer 24 and are formed by lines of green light. Light modulating layer 30 is, of course, transparent. Horizontal traces 16 are formed from the first light sensitive metal forming layer 14 using lines of red or infra-red light.

In this preferred embodiment, display 5 is designed to display images according to video standard SMPTE 274M. Horizontal traces 16 consist of 1080 traces that are 100 microns wide with 400 micron gaps between lines. There are 1920 vertical traces 28 which are 100 microns wide with 400 micron gaps between lines. Clear aperture 82 is 200 microns square in a 500 square micron pixel.

Figure 4A:
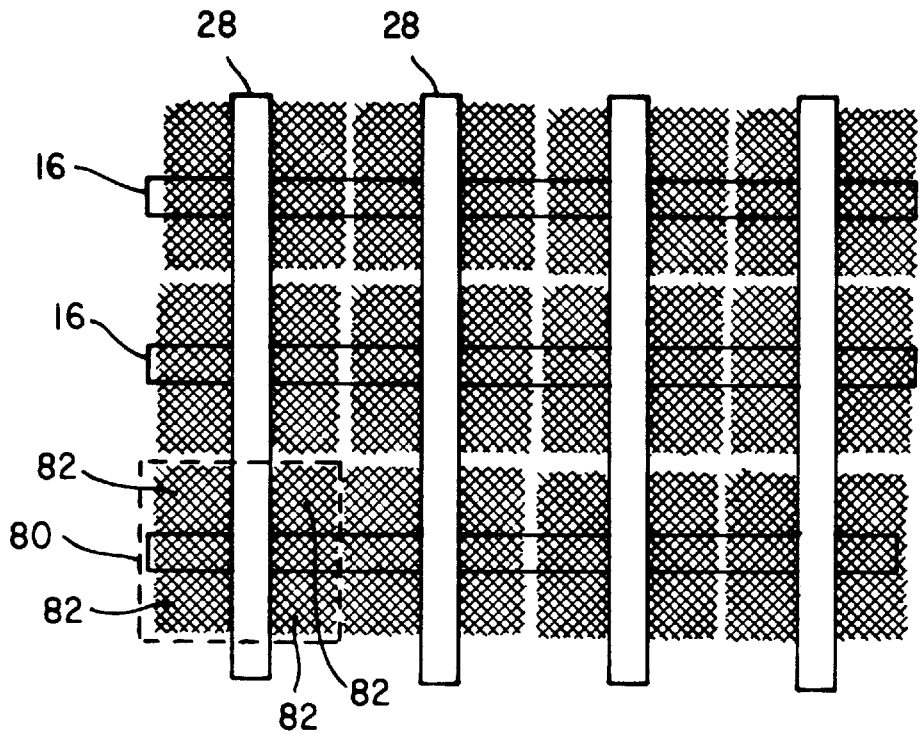
FIG. 4a is a top view of part of the display in accordance with the invention.
Figure 4B:
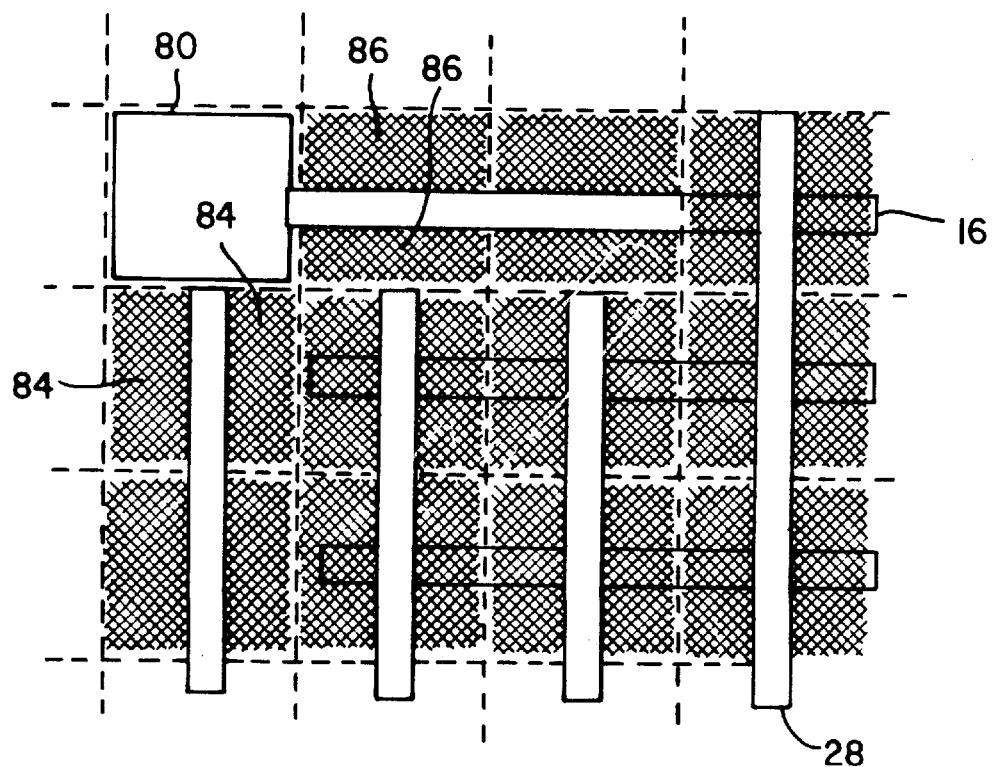

FIGS. 4a and 4b detail a conductive structure that can be formed within each light pixel 80 formed by the display 5. Horizontal traces 16 and vertical traces 28 are opaque and run through the center of each pixel in this embodiment. Clear apertures 82 act as the light modulating areas for each pixel. Horizontal traces 16 have vertical filament grids 84 across clear apertures 82. Vertical filament grids 84 can be composed of two sets of filaments 5 microns wide and pitched 15 microns apart that are orthogonal to each other and pitched a 45 degree angle. Horizontal filament grids 86 are similar in structure to vertical filament grids 84 and run horizontally from each vertical trace 28. The intersection of filament grids 84 and 86 across clear apertures 82 spread electrical charge from traces 16 and 28 across clear apertures 82. This structure has the advantage that an electrical field is stretched less than half way across pixel 80. This reduces field loss across grids 84 and 86 by reducing the distance that filament grids 84 and 86 spread charge.

Stated differently, the vertical and horizontal first and second conductive traces are aligned so that when a potential is applied between them, a field is produced which operates upon the light modulating layer 30 to selectively transmit light which passes through the vertical traces 28, the light modulating layer 30, the horizontal traces 16, and the color filter array 40 so that a displayed colored image is produced which has a plurality of light pixels 80.

The areas between filaments can be exposed to a level of radiation that causes limited metallic silver to be deposited in the clear areas between the filaments. Alternatively, a non-photosensitive, electrically conductive and optically transparent material such as fine Indium-Tin Oxide with particle size between 0.5 and 2 microns can be incorporated in light sensitive, metal forming layers 14 and 24 to spread the electrical field across opening between the filaments. In another embodiment, Indium-Tin Oxide is sputter coated on first surface 12a of substrate 12 before light sensitive, metal forming layers 14 and 24 are applied. In the presputtered embodiment, the ITO material acts to spread charge across substrate 12 in the vicinity of horizontal traces 16. This permits improvements in light transmission properties through clear aperture 82 in the first light sensitive, metal forming layer 14. Some light striking each pixel is blocked by the opacity of the traces 16 and 28 and filament grids 84 and 86, and the remainder is controlled by the electrically field between processed first light sensitive metal forming layer 14 and processed second light sensitive metal forming layer 24.

FIGS. 5a–5e are a schematic representation of how conductive traces are formed in light sensitive, metal forming layers 14 and 24 in accordance with a modification to U.S. Pat. No. 3,033,765 and U.S. Pat. No. 3,464,822. In this embodiment, unexposed silver halide 92 is the light sensitive material. In the drawing a single layer is shown for an example. In FIG. 5a, photo-mask 90 selectively blocks a source of light that strikes and exposes silver halide 94 while unexposed silver halide 92 remains inactivated. Multiple exposures using separate masks and separate color illuminant can be used to develop traces in each metal forming layer. Alternatively, a single mask having a composite multi-colored mask can be used to form traces in light sensitive, metal forming layers 14 and 24. In FIG. 5b the display 5 is photographically developed to convert exposed silver halide 94 to metallic silver 96. In FIG. 5c, a conventional photographic fixing step has removed the unexposed silver halide 92. In FIG. 5d, metallic silver 96 has been re-halogenated by a bleach to form re-halogenated silver 98. In FIG. 5e, re-halogenated silver 98 has been redeveloped to form redeveloped silver 100. Metallic salts in the developer deposits additional metal 102 to improve conductivity.

Figure 6A:
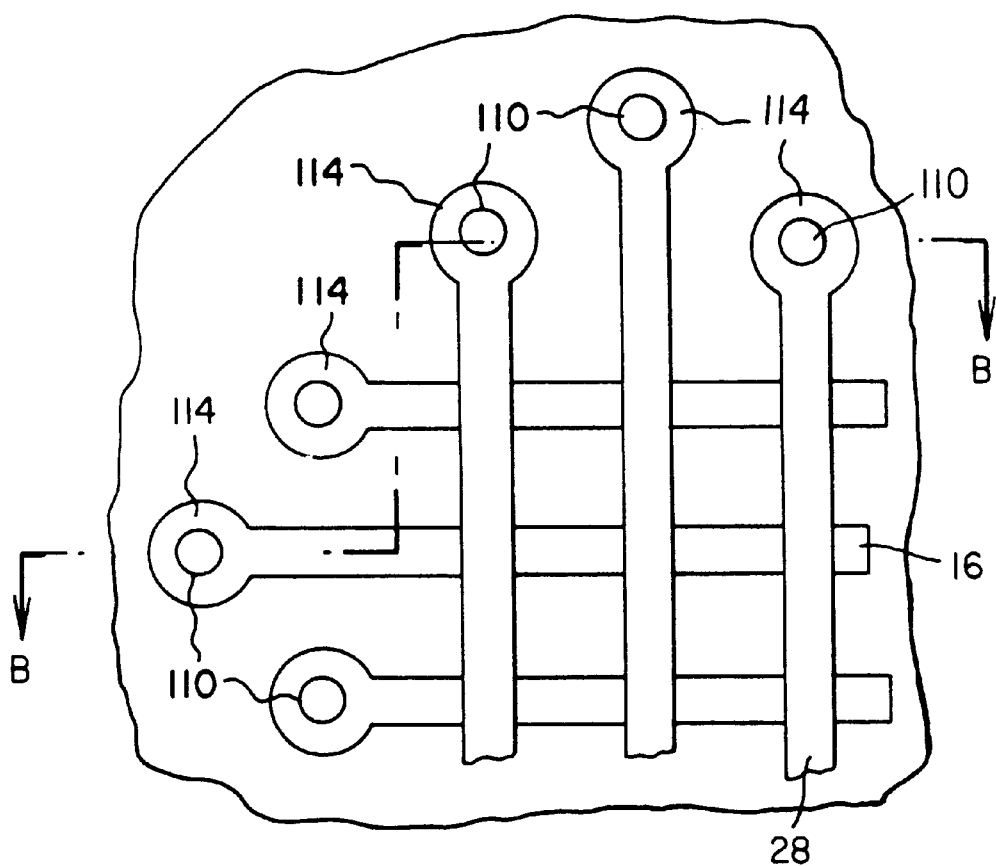
FIG. 6a is a top view showing the termination of the conductive traces.
Figure 6B:
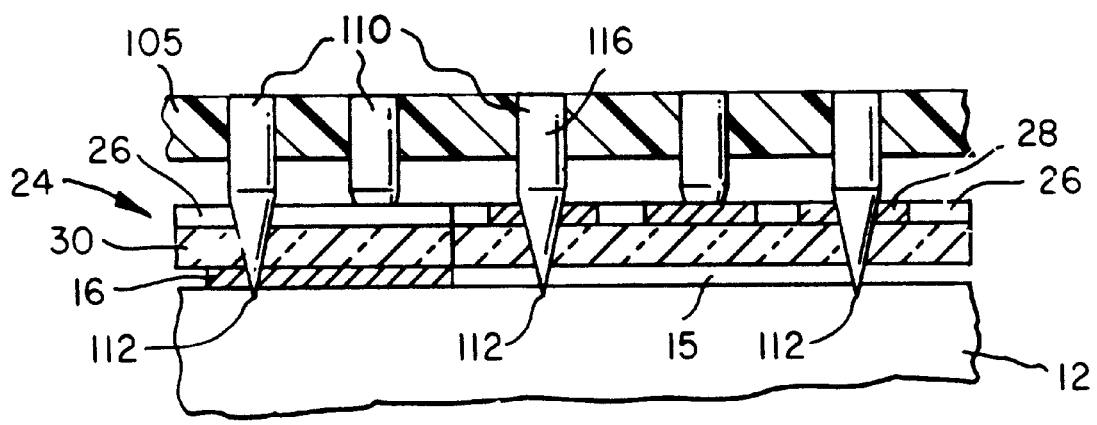

In an alternative embodiment, the silver metal particles in gelatin are subjected to a first plating bath to deposit palladium metal onto the silver grains. A final plating bath of copper salts adds additional conductor to improve the conductivity of the traces. The horizontal traces 16 are buried under light modulating layer 39. Electrical connection must be made with each individual trace. Electrical connection to display 5 is shown in FIGS. 6a and 6b. Horizontal traces 16 and vertical traces 28 terminate in a staggered pattern of conductive pads 114. Each set of traces 16 and 28 are terminated on separate sides of display 5. Pins 110 having a piercing point 112 are disposed in a rigid non-conductive substrate 105. Pins 110 can be made of electrically conductive metal such as stainless steel, brass or tungsten. All layers of display 5 must have a significantly lower strength than pins 110 so that pins 110 can penetrate through the layers into a targeted conductive traces. The pins 110 are pressed into display 5 so that piercing point 112 is driven through the pads 114 at the end of traces 16 and 28.

The piercing action provides electrical interconnection for traces 16 and 28 of the display. Because light modulating layer 30 and vertical traces 28 are formed of organic materials and silver particles, pins 110 freely penetrate light modulating layer 30 and vertical traces 28 and horizontal traces 16 an pierce through to and make connection with pads 114 that terminate horizontal traces 16. Second sheet non-conducting areas 26 over the areas being pierced provide electrical isolation between horizontal traces 16 and vertical traces 28. This technique can applied to separable displays that have been built of multiple sheets of materials to form the light-sensitive, metal forming layers 16 and 24 and light modulating layer 30.

In accordance with the present invention, pins 110 having a piercing point 112 are disposed in a rigid non-conductive substrate 105. The pins 110 are pressed into display 5 so that piercing point 112 is driven through the pads 114 at the end of traces 16 and 28. The piercing action provides electrical interconnection for conductive horizontal traces 16 and vertical traces 28 of the display. Because light modulating layer 30 and second light sensitive metal forming layer 24 are formed of organic materials and silver particles, pins 110 freely penetrate light modulating layer 30 and second light sensitive metal forming layer 24 an pierce through first light sensitive metal forming layer 14 and make connection with pads 110 that terminate horizontal traces 16. Second sheet non-conducting areas 26 over the areas being pierced provide electrical isolation between horizontal traces 16 and vertical traces 28. This technique can applied to separable displays that have been built of multiple sheets of materials to form the light-sensitive, metal forming layers 16 and 24 and light modulating layer 30.

The invention has been described in detail with particular reference to certain preferred embodiments thereof, but it will be understood that variations and modifications can be effected within the spirit and scope of the invention.

PARTS LIST 5 display
12 substrate
12a first surface
12b second surface
14 first light sensitive, metal forming layer
15 first light-sensitive non-conductive layer
16 horizontal traces
24 second light sensitive, metal forming layer
26 second sheet non-conducting areas
28 vertical conductive traces
30 light modulating layer
40 color filter array
50 red filter layer
52 red filter dye area
54 red filter undyed area
60 green filter layer
62 green filter dye area
64 green filter undyed area
70 blue filter layer
72 blue filter dyed area
74 blue filter undyed area
75 light absorbing material
80 pixel
82 clear aperture
84 horizontal filament grid
86 vertical filament grid
90 photo-mask
92 unexposed silver halide
94 exposed silver halide
96 metallic silver
98 re-halogenated silver
100 redeveloped silver
102 additional metal
105 non-conductive substrate
110 pins
112 piercing point
114 pads
116 stem portion

What is claimed is:

1. A flat panel display comprising:
   (a) a light modulating layer having two surfaces and formed of pierceable material;
   (b) first vertical and second horizontal conductive traces formed respectively on the surfaces of the light modulating layer; and
   (c) piercing pins which pierce through the light modulating layer and the first and second horizontal conductive traces so that each piercing pin is electrically connected to at least one of the first and the second conductive traces.

2. A flat panel display comprising:
   (a) a light modulating layer having two surfaces and formed of liquid crystals in a pierceable matrix;
   (b) pierceable first vertical and second horizontal conductive traces formed respectively on the surfaces of the light modulating layer; and
   (c) piercing pins which pierce through the light modulating layer and the first and second horizontal conductive traces so that each piercing pin is electrically connected to at least one of the first and the second conductive traces.

3. A method of making a display, comprising the steps of:
   (a) forming first and second patternable conductive layers over the surfaces of a light modulating layer and formed of pierceable material;
   (b) patterning the first and second layer to form conductive traces; and
   (c) inserting conductive pins to pierce through the light modulating layer and the first and second horizontal conductive traces so that each piercing pin passes through the light modulating layer to be electrically connected to at least one of the first and the second conductive traces.

* * * * *